United States Patent
Hammock (10) Patent No.: US 10,315,559 B2
(45) Date of Patent: Jun. 11, 2019

(54) SYSTEMS, APPARATUS, AND METHODS FOR SIGNALING SUDDEN DECELERATION

(71) Applicant: Jeffery Hammock, Madison, AL (US)

(72) Inventor: Jeffery Hammock, Madison, AL (US)

( * ) Notice: Subject to any disclaimer, the term of this patent is extended or adjusted under 35 U.S.C. 154(b) by 11 days.

(21) Appl. No.: 15/647,208

(22) Filed: Jul. 11, 2017

(65) Prior Publication Data

US 2018/0009372 A1    Jan. 11, 2018

Related U.S. Application Data (60) Provisional application No. 62/360,863, filed on Jul. 11, 2016, provisional application No. 62/360,867, filed on Jul. 11, 2016.

(51) Int. Cl.
| | | |
|---|---|---|
| *B60Q 1/50* | (2006.01) | |
| *B60Q 1/44* | (2006.01) | |
| *B60Q 1/00* | (2006.01) | |
| *B62J 6/04* | (2006.01) | |
| *B62J 27/00* | (2006.01) | |
| *B62J 6/00* | (2006.01) | |

(52) U.S. Cl.
CPC .......... *B60Q 1/445* (2013.01); *B60Q 1/0094* (2013.01); *B62J 6/04* (2013.01); *B62J 27/00* (2013.01); *B62J 6/00* (2013.01)

(58) Field of Classification Search
None
See application file for complete search history.

(56) References Cited

U.S. PATENT DOCUMENTS

| | | | | |
|---|---|---|---|---|
| 5,404,130 | A * | 4/1995 | Lee .................. | B60Q 1/445 340/436 |
| 5,442,333 | A * | 8/1995 | Bailey ............... | B60Q 1/445 340/467 |
| 6,225,896 | B1 | 5/2001 | Sendowski | |
| 6,249,219 | B1 | 6/2001 | Perez | |
| 6,411,204 | B1 | 6/2002 | Bloomfield | |
| 6,417,767 | B1 | 7/2002 | Carlson | |
| 7,932,820 | B2 * | 4/2011 | Hurwitz ............ | A42B 3/0453 340/432 |
| 8,482,397 | B1 | 7/2013 | Tajiri | |
| 9,327,642 | B2 | 5/2016 | Hammock | |
| 9,834,215 | B2 * | 12/2017 | Braunberger ...... | B60W 30/18 |
| 2005/0134439 | A1 * | 6/2005 | Moore .............. | A42B 3/0453 340/432 |
| 2005/0237172 | A1 | 10/2005 | Boomershine, III | |
| 2009/0261963 | A1 | 10/2009 | Ault | |

(Continued)

*Primary Examiner* — Julie B Lieu
(74) *Attorney, Agent, or Firm* — Patent Grove LLC; Tomas Friend (57) ABSTRACT

Apparatus and methods for indicating sudden deceleration may involve modifying a vehicle brake lighting system with a support frame supporting a deceleration sensor, microcontroller, an energy storage component, and power circuitry. A portable deceleration warning system includes a portable sensor unit with an accelerometer, a transmitter, a power supply, and a microprocessor, and at least one portable illumination unit with a light emitter, a receiver, and a power supply. The portable sensor unit mounts reversibly to a vehicle and the portable illumination unit can be worn by an operator or passenger of the vehicle or be temporarily attached to the vehicle.

19 Claims, 5 Drawing Sheets

(56) References Cited

U.S. PATENT DOCUMENTS

| | | | |
|---|---|---|---|
| 2010/0066528 A1* | 3/2010 | Kim | B60Q 1/447 340/479 |
| 2012/0007727 A1* | 1/2012 | Lin | B60Q 1/44 340/432 |
| 2014/0297104 A1* | 10/2014 | Braunberger | B60Q 1/447 701/36 |
| 2014/0354422 A1* | 12/2014 | Olson | B60Q 1/445 340/465 |
| 2016/0046231 A1 | 2/2016 | Steege | |
| 2016/0094964 A1* | 3/2016 | Barfield, Jr. | H04W 4/22 455/404.2 |
| 2016/0241554 A1* | 8/2016 | Zizi | H04L 63/0861 |
| 2018/0108256 A1* | 4/2018 | Braunberger | G08G 1/166 |

* cited by examiner

SYSTEMS, APPARATUS, AND METHODS FOR SIGNALING SUDDEN DECELERATION

RELATED APPLICATIONS

This application claims priority to U.S. provisional application 62/360,867 filed 11 Jul. 2016 and to U.S. provisional application 62/360,863 filed 11 Jul. 2016.

BACKGROUND OF THE INVENTION

Field of the Invention

The present invention relates generally to apparatus, methods, and systems for detecting and signaling sudden deceleration of a vehicle independent of any action by an operator of the vehicle or brake system.

Discussion of Related Art

Rear-end collision continues to be a significant cause of vehicular damage and personal injury and fatalities because of driver error and because vehicles often decelerate without the operator applying the brake. For example, downshifting, collisions, engine failure, and other mechanical problems can cause sudden deceleration without triggering the illumination of conventional brake lights. Many solutions to the problem of indicating and warning of deceleration not caused by braking have been described but none have come into common use at the time of the present invention.

U.S. Pat. No. 6,225,896 describes an emergency deceleration warning apparatus that illuminates lights when a vehicle decelerates at a rate of 0.2 G or more. The apparatus comprises a deceleration sensor circuit held within a package connected to the vehicle in a horizontal level condition. The sensor comprises a conductive liquid inside a hollow tube that forms an electric contact between two conductive contacts at one end of the tube upon a deceleration of 0.2 G or more. One drawback of such a system is that electrical contact may be triggered by events other than deceleration, such as driving through potholes or other rough surfaces.

U.S. Pat. No. 6,249,219 describes a severe braking warning system comprising a solid-state accelerometer and a microprocessor that continuously monitors vehicle acceleration to provide deceleration gradients greater than 0.1 gravity. The gradient is used to turn the brake light on and off at a programmed rate dependent on the measured deceleration. The system only indicates deceleration caused by braking and uses power drawn directly from the vehicle power system so that loss of power to the brake light would prevent the warning system from illuminating.

U.S. Pat. No. 6,411,204 describes an anti-collision safety light system for a vehicle and comprises a solid state accelerometer and a microprocessor that activates a brake light when deceleration beyond a threshold value is measured. The system is powered by the vehicle's power system. Consequently, such a system does not warn of deceleration when the vehicle's electrical system fails. Furthermore, the microprocessor is responsive to electronic input to at least occasionally interrupt activation of the brake light by the brake system, which opens the possibility of interfering with normal brake signalling if the microprocessor circuitry fails. This could result in the failure of the brake lamp to illuminate when the brakes are applied and lead to a rear-end collision.

U.S. Pat. No. 6,417,767 describes a system for indicating rapid deceleration. First and second sensors respond to acceleration in the primary direction of vehicle motion and gravity and a controller in communication with the sensors corrects for gravitational effects and initiates a warning indicator when the acceleration exceeds a threshold. The controller accounts for gravitational effects and activates the warning indicator when a mathematical combination of the two measured accelerations exceeds a threshold value, or when the first acceleration exceeds a mathematical combination of the second acceleration and a threshold value indicating an urgent deceleration. The system requires that one axis of an accelerometer be substantially aligned with a primary direction of vehicle motion and that another axis of an accelerometer be substantially aligned with the direction of the Earth's gravity when the vehicle is level. A drawback of such a system is that the system may be impaired or nonfunctional if the accelerometers are not installed with the required orientations. A deceleration sensor requiring orientation-specific mounting can produce erroneous deceleration measurements when a vehicle is traveling on an incline or a decline because the direction of gravity changes with respect to set orientation of the sensor. This can lead to the false positive or false negative illumination. Centrifugal forces experienced in hard turns can also cause false positive illumination.

U.S. Pat. No. 8,482,397 describes a deceleration-activated brake light system comprising a speed sensor that detects vehicle decelerating and coasting, a brake sensor switch that determines if deceleration is caused by application of a brake pedal, a throttle position sensor that determines whether a gas pedal is pressed, an engine/exhaust brake switch that determines if an engine/exhaust brake is engaged, and a microcontroller that activates the brake light system of the vehicle based upon inputs from the sensors. Drawbacks of such a system include the complexity of installation and lower reliability when compared to less complex systems.

U.S. Pat. No. 9,327,642 describes a self-powered deceleration-triggered stop lamp for installation into a light socket of an automobile. The lamp comprises a plurality of LEDs and a deceleration sensor mounted to a support frame. A computer-based controller mounted is coupled to the deceleration sensor and compares a measured deceleration value to a pre-defined threshold and issues a signal to illuminate the LEDs if the measured deceleration value is greater than or equal to the pre-defined threshold. An energy storage component is also mounted to the support frame and coupled to said LEDs so they can be powered independently from the vehicle's brake circuitry. A charging circuit allows the energy storage component to be recharged by the vehicle's electrical system when the brakes are applied. A drawback of this stop lamp is that it cannot be used with vehicles that do not have light sockets with replaceable bulbs.

US 2005/0237172 describes a warning system housed in a license plate bracket that includes a self-contained power source, an accelerometer, and a microprocessor unit. When the system senses that the vehicle is decelerating at a rate greater than a threshold level, it illuminates warning lights provided on the license plate bracket. The warning system is self-contained and self-powered to avoid the need to draw power from the vehicle. One drawback of such a system is that the license plate is located low on the vehicle, which decreases visibility. Additionally, battery life may require frequent battery replacement and depletion while driving could render the system inoperable without the driver being aware of the failure. A major drawback to this architecture is that following drivers are not conditioned to respond to license plate frames alone indicating deceleration.

US 2009/0261963 describes a vehicle deceleration warning system including an accelerometer, means for measuring the speed of the vehicle, a control unit, a brake light relay, and a brake light. The control unit activates the brake light relay to illuminate a brake light if a measurement taken by the accelerometer indicates a deceleration above a threshold value or if the system measures a vehicle speed below a pre-determined threshold. The system does not compensate for erroneous deceleration measurements caused by road conditions such as potholes or rough surfaces, or hard turns. No warning of a sudden stop is possible at low speed because the brake light are constantly illuminated at low speed, when vehicles often follow very close behind.

US 2016/0046231 describes a vehicle deceleration warning system comprising a primary brake pedal sensor, a secondary brake control sensor, a transmission sensor, a wheel speed sensor, a visual indicator, and a control unit which receives the sensor signals and controls activation of the indicator. The system controls a brake light or an indicator light as a function of vehicle deceleration and as a function of normal service brake pedal or secondary brake operation. Acceleration is measured based on wheel speed over time. Consequently, any event in which wheel speed does not change with vehicle speed could result in an erroneous signal. For example, when the wheels slide rather than rotate, it is impossible to obtain an accurate measurement of deceleration. The same is true when one or more of the wheels spin.

WO 2009/049332 describes an early warning brake system with an accelerometer that constantly measures deceleration and stores maximum deceleration values in a computer. The system calibrates itself to the braking force of the vehicle, and optionally to the driver, to provide suitable indication of an emergency braking event and to compensate for the measured braking power when the car is traveling on a sloped surface. The system is powered when the brake is applied and does not measure, or warn of, deceleration in the absence of braking.

WO 2014/152262 describes a brake lamp module for a vehicle comprising a housing carrying a lamp, an accelerometer, and a control unit. The control unit is configured to provide power to illuminate the lamp in response to rapid deceleration independently from actuation of the brake pedal by the operator. A selected acceleration threshold is associated with a hazard event such as a vehicle collision or loss of control. Abrupt changes in vertical acceleration are interpreted as a hazard events and cause brake light illumination even when the vehicle is not decelerating in the direction of motion. Rather than filtering out erroneously measured deceleration values caused by rough road surfaces such as potholes or rumble strips, driving over such surfaces is interpreted as a hazard event and provides a false positive indication of deceleration in the direction of motion. The system comprises a lamp device and is not connected to and does not control an existing brake lamp in a vehicle.

Despite the numerous descriptions of deceleration warning systems and apparatus, none of the described systems has come into general use because of various limitations including difficulty of installation, inadequate prevention of false positive illumination of brake lamps, possible interference with normal brake light operation, and no indication of warning system status or failure. A warning system that relies directly on a vehicle's power system for detecting and signalling non-braking deceleration can limit its safety because deceleration may occur after electrical system failure. For example, an engine fire, a front-end collision separating or destroying the battery, or a blown fuse can render the original brake light circuit unable to illuminate the brake lights. A vehicle operator may have no means for determining whether the system is functioning as intended or whether the system is illuminating too often or not at all. Systems requiring modifications to the vehicle's wiring system for connection to electrical power and/or additional lighting being mounted on the vehicle may be difficult or expensive to install. Most deceleration warning systems illuminate in response to the vehicle experiencing a deceleration that exceeds a predetermined threshold. Road vibrations, hard turns, and other road conditions or non-deceleration maneuvers may cause erroneous detection of acceleration values exceeding the threshold value. Any illumination that is not a result of deceleration in the forward vector of the vehicle is a false positive indication. In addition to artifacts caused by road conditions, rough suspension in automobiles and trucks and especially motorcycles and trailers can result in exaggerated accelerations perpendicular to the road surface which can lead to false positive indications in existing warning systems.

Two-wheeled vehicles, such as motorcycles and bicycles are popular modes of transportation but are associated with higher risks of injury. For example, motorcycles and scooters are often overlooked by people driving automobiles and trucks, in part, because motorcycles and scooters are relative small compared to automobiles. Motorcycles are also generally capable accelerating and stopping faster than automobiles, a fact of which many motorists are unaware. This often results in motorists anticipating the movement of motorcycles incorrectly and can lead to collisions. The ability of motorcycles to brake and decelerate much faster than automobiles can result in motorcycles being hit from behind by motorists that follow too closely. Motorcyclists also tend to apply brakes less often than other motor vehicles when decelerating. A high horsepower to weight ratio for many motorcycles allows a motorcyclist to decelerate without any warning to other motorists without activating a brake light. The operators of motorcycles, scooters, bicycles, and other open vehicles suffer more severe injury than automobile drivers because these vehicles lack the weight, protective structure and safety devices found in automobiles. Lighting that indicates deceleration and improves visibility to following vehicles is highly desired.

U.S. government research on automotive tail light positioning has found that significantly fewer accidents occur in vehicles having a brake light positioned at or near the highest point on the rear of the vehicle. The U.S. government has mandated that automobiles sold in the U.S. be equipped with a third brake light positioned near the highest point on the rear of the vehicle, i.e. a center high-mounted stop lamp (CHMSL). No similar law has been passed for motorcycles, however, and a light similar in position to an automotive CHMSL is needed for motorcycles.

Many solutions to the problem of indicating and warning of deceleration not caused by braking have been described but none have come into common use.

U.S. Pat. No. 6,933,839 describes a vehicle safety system comprising a local unit mounted to the vehicle and wired to the vehicle's electrical power system that detects braking and deceleration and emits wireless transmissions to a portable remote unit that produces warning signals based upon the wireless transmissions received.

US 2007/0247296 describes a lighting system that can be mounted on a motorcycle or bicycle helmet. Accelerometers mounted to the helmet or to the vehicle are coupled to the helmet and a processor mounted on the helmet processes signals from the accelerometers. A light mounted on the helmet is responsive to the processed signal and illuminates in response to a sensed deceleration force. The system may include low-pass and high-pass filters to remove helmet motion artifacts from the sensor signals but the system does not disclose any other type of filtering to prevent false positive warning signals caused by rough road surface, driving up or down slopes, or vertical acceleration.

US 2007/0063831 describes a lighting mechanism attached to a garment of a motorcycle rider comprising and LED array and an RF receiver linked to the motorcycle lighting system. The LED may illuminate based on a signal from the lighting system or a signal from an accelerometer.

US 2012/0218098 discloses an apparatus for providing deceleration rate information by variably adjusting a lighting mechanism to quantitatively signal the deceleration rate. The apparatus mounted on an article of clothing, a bag, or the vehicle itself.

WO 1998/036213 describes safety system comprising a helmet with an illumination indicator and a braking sensor that detects vehicle deceleration independently from brake light illumination to activate illumination of the indicator on the helmet via a transmitter and a receiver.

Despite the numerous descriptions of deceleration warning systems and apparatus, one or more limitations have prevented the described systems from coming into general use.

SUMMARY OF THE INVENTION

The presently described invention fills needs in the art that are not satisfied by the above mentioned apparatus, systems and methods.

In one aspect, the invention provides an apparatus for modifying an existing vehicle brake indiction system to activate when the vehicle experiences deceleration exceeding a threshold value whether the brakes are applied or not.

In another aspect, the invention provides an apparatus for inclusion in a vehicle brake indication system so that the brake light activates when the vehicle experiences deceleration exceeding a threshold value whether the brakes are applied or not.

In yet another aspect, the invention provides a deceleration warning system for a vehicle that operates without constant consumption of power from the vehicle.

In yet another aspect, the invention provides a method for modifying an existing vehicle brake indication system to activate when the vehicle experiences deceleration exceeding a threshold value whether the brakes are applied or not.

In yet another aspect, the invention provides an apparatus that warns of deceleration exceeding a threshold value with improved removal of erroneous activation resulting from rough road surfaces, potholes, hard turns, road vibration, up hill and down hill grades, vertical acceleration and other causes of measured accelerations not related to vehicle deceleration.

In yet another aspect, the invention provides an improved deceleration sensor for a vehicle deceleration warning system in which the performance of the sensor does not depend on the orientation of the sensor when mounted to the vehicle.

In yet another aspect, the invention is a system comprising a sensor and control apparatus and a feedback display device.

In yet another aspect, the present invention provides a completely portable deceleration-activated lighting system and method that operates independently of any vehicle power supply. The lighting system detects all vehicle acceleration and deceleration, including deceleration caused by braking, engine braking, downshifting, and collisions.

In yet another embodiment, the invention provides a transmitter-receiver system in which original vehicle lighting and one, two, or more deceleration warning system lighting illuminate simultaneously in response to braking and deceleration.

In yet another embodiment, the invention provides a portable deceleration-activated lighting system comprising wearable illumination wirelessly coupled to a vehicle mounted deceleration sensor.

These and other aspects and advantages of the invention, and improvements relative to the state the art are described in more detail herein below.

BRIEF DESCRIPTION OF THE DRAWINGS

A more complete understanding of the present invention is derived by referring to the detailed description and claims when considered in connection with the Figures, wherein like reference numbers refer to like items throughout the figures and in which:

DETAILED DESCRIPTION OF THE INVENTION

As used herein, a brake lamp may comprise any number of LEDs, incandescent, and/or other types of light bulbs. A brake lamp may comprise a combination of one or more tail lights with one or more brake lights. Brake lights may also be referred to as stop lamps. A brake lamp may also be a high mount or center high mount stop lamp, which may also be referred to as a third brake light. A brake lamp may be present in a powered vehicle such as an automobile, motorcycle, truck, snowmobile, or watercraft or a brake lamp may be present in a trailer designed to be pulled by and electrically connected to an electrical system of a motorized vehicle.

As used herein, a "portable sensor unit" is a sensor unit that designed to be reversibly and temporarily mounted to a vehicle in such a way that the acceleration forces experienced by the vehicle are also experienced by the sensor unit. A portable sensor unit does not require an electrical connection to a vehicle electrical system for power or operation.

As used herein, an accelerometer is a conventional three-axis solid state accelerometer, a micro machined multi-axis solid state accelerometer or an equivalent accelerometer that measures acceleration in three, preferably orthogonal, axes.

The words "microprocessor," "microcontroller," "computer," and "controller" are used herein to refer to any of a the computer-based processors available such as a field programmable gated array (FPGA), an application specific integrated chip (ASIC), a programmable circuit board (PCB), a multiple chip module (MCM), an integrated chip (IC) device, or any combinations thereof. Control logic (i.e., computer programs) are stored in the main memory and/or secondary memory. Control logic, when executed, enables the computer system to perform certain functions as described herein and may advantageously be implemented as one or more modules, which may be configured to reside on the processor memory and execute on the one or more processors. The modules include, but are not limited to, software or hardware components that perform certain tasks.

A "power supply" or "power source" in reference to the present invention is an energy storage device that is connectable to the vehicle's battery and electrical system and provides power sufficient for normal operation. In a preferred embodiment, a rechargeable battery. The power supply may comprise circuitry allowing it to be recharged in place. Additionally or alternatively, the power supply may be removed from a sensor unit or illumination unit for recharging remotely to the unit from which it is removed.

Fixing the position of an apparatus relative to a vehicle, or portion of a vehicle, may involve means for attaching the apparatus, or a support frame of the apparatus, to a fixed element of the vehicle. Attaching may involve the use of, for example, glue, welds, bolts, screws, clamps, double-sided adhesive strips, or magnets.

As used herein, a "bypass circuit" in a device is a circuit that functions independently from other circuits in the apparatus to convey electrical energy from one electrical connector of the device to another electrical connector of the device. Other circuits may be connected to the bypass circuit in such a way that the bypass circuit functions whether any or all other circuits of the device are functional or not.

As used herein, a "threshold value" with respect to acceleration values is a predetermined value for acceleration measured by a deceleration sensor for a time t. A threshold acceleration value may be for a single axis or a combination of two or more axes. A threshold acceleration value may be constant or it may vary according to a predetermined function of a measured acceleration value. For example, a threshold acceleration value in one axis may be a function of a measured acceleration value for a different axis. Measured and threshold acceleration values at a time t for different axes may be mathematically combined into measured and threshold acceleration vectors at time t.

Acceleration may be positive or negative. Negative acceleration is used herein as equivalent to deceleration. Acceleration is measured many times "t" per second in three, preferably orthogonal, axes. Measured acceleration values in three different axes may be combined into a vector comprising the three measured components. A predefined threshold value required for triggering a signal to activate an illumination unit may be constant or preferably varies in a predefined manner depending on the relative magnitudes of the measured accelerations along different axes. In other words, the threshold value for the vector derived from the combination of three measured values may vary in a predefined way depending on the relative values for one or more of the three measured acceleration values. For example, the threshold value for a time t may decrease with a measured negative acceleration at time t in the direction of gravity and/or the threshold value for a time t may increase or decrease relative to a centrifugal force encountered when the vehicle is turning.

The terms "reversibly mounting," "reversible attachment," "temporarily mounting," to a vehicle are used herein to describe easily removable but secure attachment. Means for accomplishing reversible attachment or reversibly mounting or temporarily mounting to a vehicle may comprise a first component that may or may not remain on the vehicle and a second component on an article to be reversibly or temporarily attached to first component, without the use of tools, such as a quick release plate, toggle clamp, quick release clamp, and quick release buckle systems, quick release magnetic mount, quick release programmable magnets mount, and the like. Reversible or temporary attachment may also include single component attachment means on the article to be attached such as as toggle clamps, quick release clamps, quick release buckles. With respect to an illumination unit according to the invention, means of reversible attachment to a vehicle operator or vehicle passenger may include a helmet, an article of clothing such as a coat, vest, jacket, or shirt, or an accessory item such as a belt, a headband, gloves, or hat.

Figure 1:
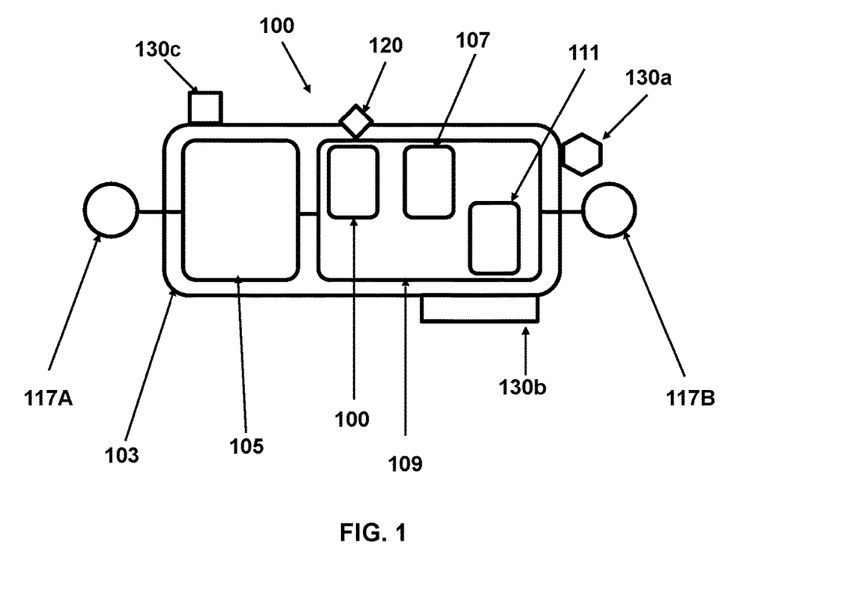
FIG. 1 illustrates a general structure of an exemplary sensor and control module.

With reference to FIG. 1, a general structure of a sensor and control apparatus 100 according to the invention comprises a support frame 103 housing a circuit board 109, a power source 105, a microcontroller 107, a deceleration sensor 111, and power circuitry 115 (FIG. 2) adapted for receiving DC power from a vehicle electrical system to recharge the power source 105. The apparatus 100 comprises an electrical connector 117a suitable for connection to a stop lamp connector having contacts for coupling power from the automobile's power system to a stop lamp and an electrical connector 117b, suitable for connection to a stop lamp having contacts for coupling power from the automobile's power system. Electrical connectors 117a and 117b allow the sensor control apparatus to be quickly and conveniently installed by disconnecting an electronic coupling between a stop lamp and a vehicle's electrical system, connecting electrical connector 117b to the stop lamp, and connecting electrical connector 117a to the vehicle's electrical system. For example, the connection between a vehicle's electrical system and a brake lamp is often in the from of a waterproof socket connector comprising a male side and a female side which, when connected, form a waterproof box with a wire pigtail connecting to the electrical system. In some embodiments, electrical connectors 117a and 117b are configured to connect to male and female sides of a vehicle's existing brake lamp connector or visa versa. Automotive brake lamp connectors, including sockets and harnesses are well known in the automotive industry and will not be described further here. It is understood that a sensor and control apparatus 100 may alternatively be equipped to a vehicle during manufacture without first disconnecting a vehicle's electrical system from a brake lamp. An advantage of incorporating electrical connectors of this type into the deceleration sensor and control apparatus 100 is that apparatus may be adapted to function in most types of automobiles, trucks, motorcycles, and other powered vehicles. Another advantage is that the apparatus may be adapted to convert the brake light of a trailer in similar fashion to warn of deceleration not caused by braking. For such applications, the apparatus may additionally comprise a quick release coupling between electrical connection 117a and the support frame 103 so that, in the event of uncoupling between a trailer and a towing vehicle, power from the power source 105 will continue to be available to the trailer brake lamp for illumination.

The power source 105 preferably comprises one or more rechargeable batteries. Deceleration sensor 111 comprises a three-axis accelerometer which may be, for example, a conventional three-axis solid state accelerometer or a micro machined multi-axis solid state accelerometer. The sensor is configured to sample all three axes at all times t. One advantage of this is that no calibration step is required for initial install or during operation. The sensor and controller apparatus 100 is configured to be connected to the brake lamp and the vehicle's electric system through a standard connector at electrical connectors 117a and 117b. In cases where the brake lamp comprises both a tail light and a brake light, the sensor and control apparatus 100 may be configured to receive power from the vehicle delivered for the activation of the tail light as well as power delivered for the activation of the brake light.

Figure 2:
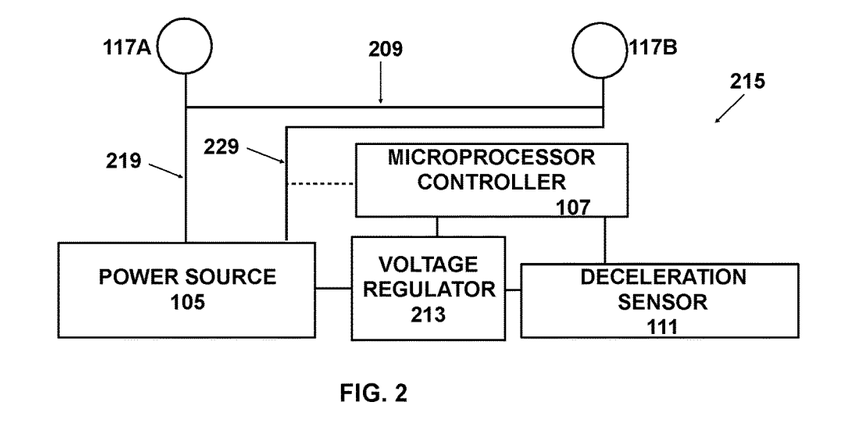
FIG. 2 presents a diagram of an embodiment of a power circuit.

FIG. 2 shows a diagram of an embodiment of a power circuit 215 for a sensor and control apparatus 100. A by-pass circuit 209 is configured to convey electrical signals indicating braking from the electrical connector 117a through the apparatus to electrical connection 117b without interruption when the brakes are applied. An advantage of this feature is that normal brake light operation is not prevented in the event of a failure elsewhere in the electrical system of the apparatus. A charging circuit 219 is configured to draw a portion of electrical current from the bypass circuit 209 to charge the power source 105 without interfering with the normal operation of the brake lights. Additionally or alternatively, the charging circuit 219 may be configured to divert power from the bypass circuit to power source 105 when the automobile tail lights are illuminated. In another embodiment, the apparatus 100 may additionally or alternatively comprise an energy harvesting device that converts kinetic energy into electricity and is electrically coupled to power source 105 to provide energy for recharging. Such an energy harvesting device may use the movement of a magnet in an electromagnetic generator to generate power for recharging or a piezoelectric device stimulated to vibrate by road and/or engine vibrations. Additionally or alternatively, a thermoelectric generator comprising a junction of two dissimilar materials in the presence of a thermal gradient may be used to provide power for regeneration.

Power source 105 powers microcontroller 107 and deceleration sensor 111, preferably through one or more voltage regulator(s) 213. Power source 105 is also connected to an illumination circuit 229 to provide electrical power to the brake lamp through electrical connector 177b when instructed to do so by the microprocessor controller 107 (dashed line). This may be accomplished, for example, by the closing of a switch in the illumination circuit 229 by the controller in response to a measured deceleration at or above a threshold value.

The deceleration sensor 111 produces an output that is transmitted to the microprocessor controller 107. The deceleration sensor 111 preferably comprises a three-axis accelerometer that measures acceleration in each of three orthogonal axes for each time t. The deceleration sensor may additionally comprise a microprocessor configured to convert measured acceleration values into a combined acceleration vector. Alternatively, the microprocessor controller 107 may be configured to convert measured acceleration values into a combined acceleration vector.

Microprocessor controller 107 is preferably configured to analyze the measured acceleration vector at each time t to assess the relative contributions of axes in the direction of travel, the direction of gravity, and a direction orthogonal to gravity and the direction of travel. The physical axes of acceleration measurement need not be aligned along the horizontal or vertical because the microprocessor controller 107 comprises software configured to detect the orientation of the gravity force vector with respect to the 3-axes of the accelerometer independent of its orientation. The software is also configured to establish the direction of forward motion and orthogonal to forward motion based on measured acceleration profiles characteristic of forward and lateral motion. The microprocessor also comprises software that selects a trigger threshold value for brake light activation depending on incline and decline of a road surface and depending on a centrifugal acceleration force in the plane of, and perpendicular to, the direction of motion caused by hard turns. The threshold value required for triggering to activate the illumination circuit is derived from the combination of measured accelerometer values in three orthogonal axes and the trigger value varies in a predefined way depending on the relative measured values for the three axes. Incline and decline travel causes the measured acceleration value for a time t to increase or decrease with respect to the direction of gravity. The threshold value for a time t may increase or decrease relative to travel uphill or downhill, respectively. Centrifugal force may cause an increase in the measured acceleration at time t in an axis perpendicular to forward motion. The threshold value for a time t may increase or decrease relative to a centrifugal force encountered when the vehicle is turning. Acceleration values from all three axes are used to improve the fidelity of the threshold calculation and to avoid false positives due to rough road surfaces, vehicle vibration, inclined road surface and curves in the roadway.

The microcontroller 107 is configured with control logic that, upon receipt of an output signal from the deceleration sensor 111 for a time t, compares the measured acceleration value to a pre-programmed threshold defined to indicate whether the vehicle is decelerating at sufficiently high rate to initiate energizing the vehicle's brake lamp connected at electrical connector 117b to indicate deceleration. If the measured acceleration value is determined to be greater than the pre-programmed threshold, control logic within the microcontroller 107 executes and a command signal to illuminate the brake lamp with power from the the power source 105 illumination circuit 229. If the measured acceleration value is determined to be less than the pre-programmed threshold, control logic within the microprocessor controller 107 executes no command signal to illuminate the brake lamp.

Figure 3:
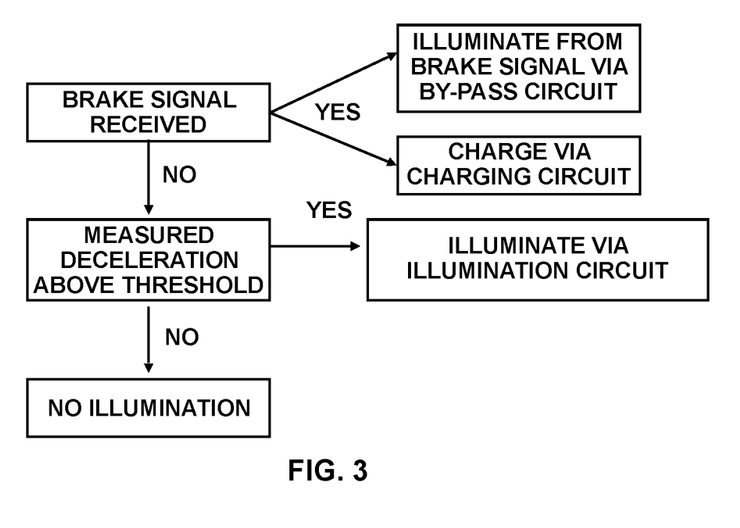
FIG. 3 is a state diagram for an embodiment of the invention.

FIG. 3 is a state diagram of one embodiment of the sensor and control apparatus 100. If a signal is received through electrical connector 117a that the brakes are applied at time t, the signal is automatically passes through to electrical connector 117b via the by-pass circuit 209 to illuminate the brake lamp. This electrical signal from the vehicle is conducted through by-pass circuit 209 whether the rest of the apparatus is functional or not and does not depend on the operation of a switch. When the by-pass circuit is active, a portion of the electrical energy passing through the by-pass circuit is diverted to the charging circuit 219 and delivered to power source 105 for recharging. Microprocessor controller 107 comprises control logic programmed in such a way that, when the by-pass circuit 209 is active, no command is issued to illuminate the brake lamp using power from power supply 105. The control logic is also programmed so that, when the by-pass circuit 209 is not active, i.e. the brakes are not being applied, a measured acceleration output from deceleration sensor 111 is received by the microcontroller 107 and compared to a threshold value. If the measured deceleration for time t meets or exceeds a threshold value, the logic causes a control signal to activate the illumination circuit 229 using energy from power supply 105 to provide energy to electrical connector 117b to illuminate the brake lamp. If the threshold is not met or exceeded, the the brake lamp is not illuminated.

The microprocessor 107 may be programmed with one or more threshold values that vary in a way to control activation of illumination circuit 229 to trigger illumination to indicate a deceleration. The threshold value(s) of the vector may vary depending on the relative values for one or more of the three measured values. For example, the threshold value for a time t may decrease with a measured negative acceleration at time t in the direction of gravity and/or the threshold value may increase with a measured positive acceleration at time t in an axis perpendicular to forward motion. One advantage of the feature of a variable threshold of this type is the ability to effectively filter the accelerometer data to remove road noise and other artifacts that can lead to signal that falsely indicate deceleration events. The variability of the threshold value may be embodied as a set of threshold values with a particular threshold value being selected at time t based upon a component of the acceleration vector for time t.

The deceleration sensor and control apparatus 100 may comprise means 130a-c for fixing the position of the apparatus relative to a vehicle, or a portion of a vehicle. Additionally or alternatively, the sensor and control apparatus 100 may be fixed in place using fixing means provided separately from the apparatus 100. It is important that the movement of the vehicle be transmitted to the deceleration sensor 111. Installation of the apparatus comprises mounting the support frame 103 to the vehicle in such a way that the support frame 103 does not move relative to the vehicle in any direction. The apparatus 100 may comprise means for attaching the apparatus, or a support frame of the apparatus, to a fixed element of the vehicle. Such attachment means may include, for example, glue, welds, bolts, screws, clamps, magnets, double-sided adhesive strips, or any combination thereof.

Figure 4:
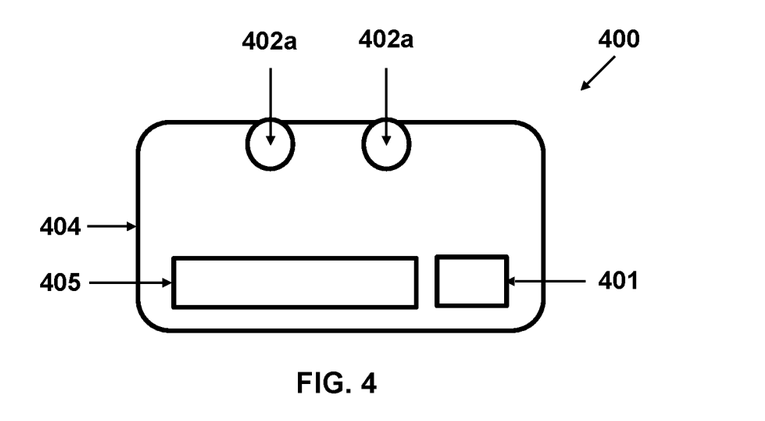
FIG. 4 is a schematic of a feedback display.

In addition to the embodiments described herein above, an embodiment of the sensor and controller apparatus may comprise a transmitter coupled to microprocessor controller 107 and power source 105 with controller 107 comprising control logic to activate the transmitter using power from power source 105 when it activates illumination circuit 229. This embodiment may be combined with a feedback display device 400 to form a sensor and control system. The feedback display 400 comprises a support frame 404 holding a receiver 401 coupled to a visual indicator 401a in view of an operator of the vehicle to provide a feedback system that indicates to the vehicle operator that the sensor and control apparatus 100 is functioning. Visual indicator 401a may be a light source such as a light bulb or LED. In one embodiment, the feedback system may be configured to provide feedback to the operator indicating each time the brake lamp is illuminated using battery power through the illumination circuit 229. The feedback display 400 may be configured to be connected to and powered by the vehicle's electrical system. Another embodiment may additionally or alternatively comprise a power supply 405 to power the feedback device, including receiver 401 and the visual indicator 401a. Power supply 405 may be, for example, a power cell, battery, or rechargeable battery. The feedback display 400 may further comprise an audible feedback indicator 401b coupled to the receiver to produce an audible sound that indicates to the vehicle operator that the sensor and control apparatus 100 is functioning. In one embodiment, the feedback system may be configured to provide audible feedback to the operator each time the brake lamp is illuminated using battery power through the illumination circuit 229.

An embodiment of the sensor and control apparatus 100 may be configured for connection to a vehicle telematics system wherein signals are transmitted from the apparatus 100 and stored by the telematics system and/or transmitted as data by the telematics system.

A method for installing an apparatus 100 to a vehicle may comprise mounting the apparatus to the vehicle; connecting electrical connectors 117a to an electrical connector of the vehicle leading to the vehicle's electrical system; and connecting electrical connector 117b to an electrical connector of a brake lamp. A method for installing a system including a feedback device 400 further includes mounting the feedback device in the cabin of the vehicle so that it is visible to an operator of the vehicle. If the feedback device 400 is configured to be powered by the vehicle's power supply, the method further includes connecting the feedback device to the vehicle's power supply.

Figure 5:
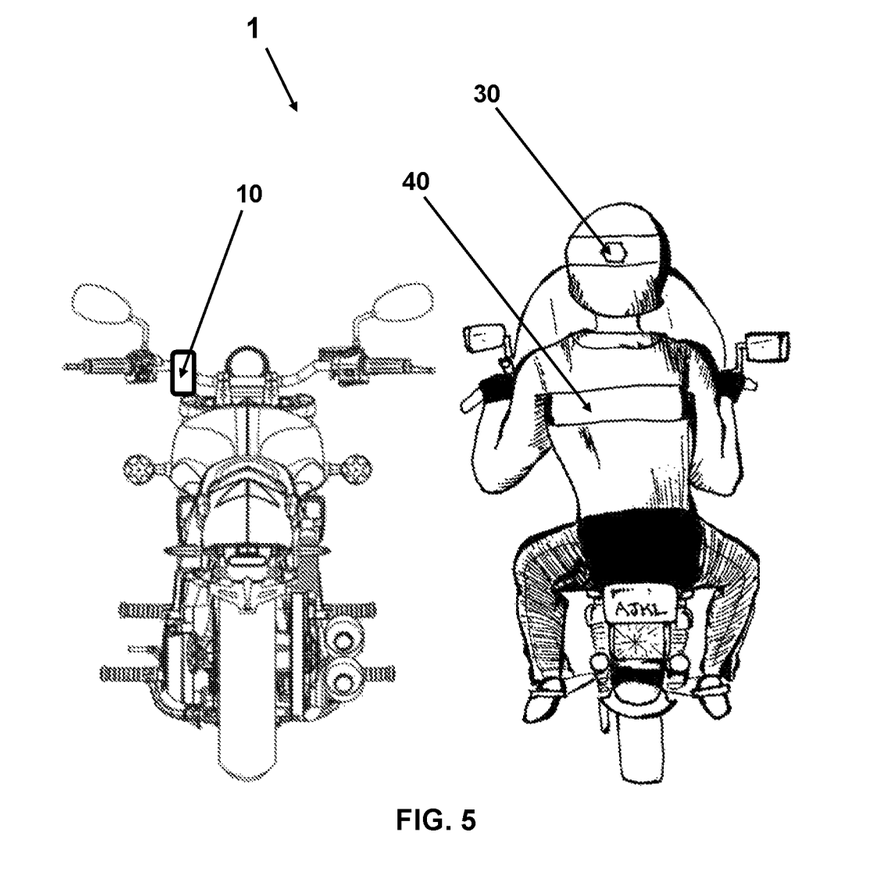
FIG. 5 is an illustration showing an embodiment of a portable deceleration warning system comprising a sensor unit for attachment to a vehicle and an illumination unit.

With reference to FIG. 5, a portable deceleration warning system 1 comprises a sensor unit 10 and at least one illumination unit 30, 40. The sensor unit 10 is configured for attachment to the vehicle such that acceleration experienced by the vehicle in any direction is also experienced by the sensor unit 10. This is an advantage over accelerometers worn by a vehicle operator because operator's body movements can buffer, or reduce the magnitude, of the measured acceleration compared to actual deceleration of the vehicle. Temporary, reversible attachment to the vehicle may be accomplished by any reversible, temporary attachment means that locks the position of the sensor unit relative to the vehicle. In one embodiment, such attachment means may include quick release attachments between a housing on the sensor unit 10 and a quick release clamp on the vehicle. In another embodiment, such a quick release attachment may include a quick release clamp permanently attached to the sensor unit. In another embodiment, such a quick release attachment may include a magnetic mount or a programmable magnets mount. In yet another embodiment, reversible attachment may be achieved by applying sufficient pressure between a shaped housing on the sensor unit and a complementary shaped receptacle mounted to the vehicle. Pressure may be provided, for example by one or more elastic straps and/or tightening means on one or more straps with quick release buckles. The vehicle in FIG. 5 is depicted as a motorcycle or motor scooter. A portable deceleration warning system 1 may also be used with other vehicles such as personal watercraft, motorboats, jetboats, snowmobiles, bicycles, all terrain vehicles, and automobiles, for example. For vehicles or craft in which the operator is not visible, an illumination unit 30,40 is reversibly attached to the vehicle in a position visible to following vehicles or craft. An illumination unit 30,40 may be reversibly attached or worn by the the operator of the vehicle or, if a passenger is seated directly behind the operator, by passenger of the vehicle. As explained below, in some embodiments, an illumination unit may additionally or alternatively be reversibly attached to another vehicle or to or worn by an operator or passenger of another vehicle.

Figure 6:
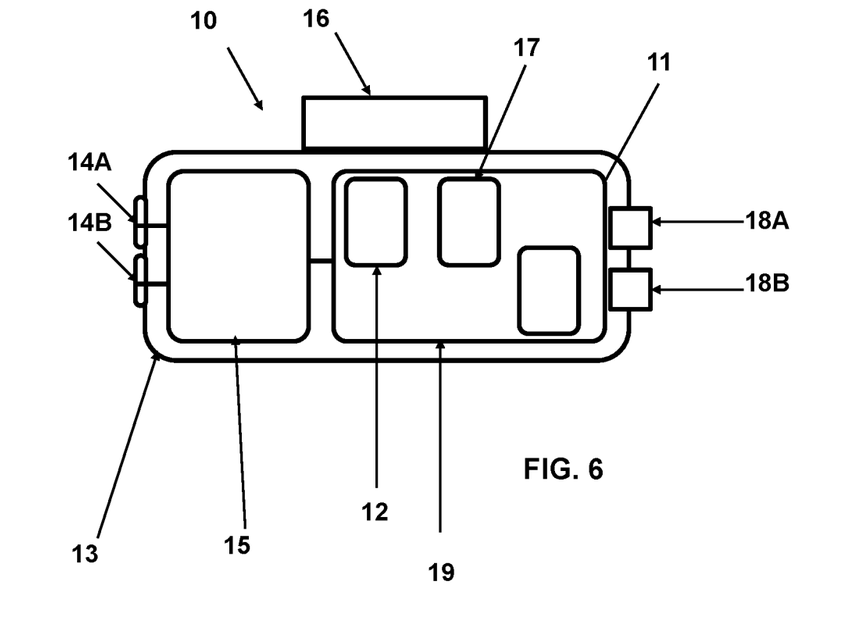
FIG. 6 is a front view an embodiment of a sensor unit.

FIG. 6 is a front view of one embodiment of a sensor unit 10 comprising a sport frame or housing 13 with a means for reversible attachment 16 for temporarily mounting the sensor unit 10 to a vehicle. Support frame 13 holds a power supply 15 connected to a circuit board 19, which comprises an accelerometer 11, a voltage regulator 12, a battery recharging circuit, and microprocessor or microcontroller 17. The power supply 15 preferably comprises one or more rechargeable batteries providing DC power to the voltage regulator 12, which provides power to the microprocessor 17 and the accelerometer 11. In a different embodiment, the sensor unit 10 may comprise more than one voltage regulator 12 providing different voltages to the accelerometer and the processor. The power supply 15 may alternatively or additionally comprise a fuel cell and the sensor unit 10 may optionally comprise a connector for connecting the power supply 15 to a charger or supplemental power supply such as an additional battery or battery pack or triple charger that converts kinematic motion into electrical power. The power supply must be sufficient for independent operation of the sensor unit without drawing any power from the vehicle so that the sensor unit is truly portable and capable of use with, for example, bicycles lacking any electrical power.

The accelerometer 11 may be a conventional three-axis solid state accelerometer, a micro machined multi-axis solid state accelerometer or an equivalent accelerometer that measures acceleration in three, preferably orthogonal, axes. Acceleration values measured by the accelerometer 11 for a time tin each of three different axes are combined by the microprocessor 17 into a vector comprising three components corresponding to the measured value. This process eliminates the need for accelerometer calibration. The microprocessor 17 may be programmed with one or more threshold values that vary in a predefined, or preprogrammed, way to control activation of the transmitter 14a to trigger illumination to indicate a deceleration and/or a crash. The threshold value(s) of the vector may vary depending on the relative values for one or more of the three measured values. For example, the threshold value for a time t may decrease with a measured negative acceleration at time t in the direction of gravity and/or the threshold value may increase with a measured positive acceleration at time t in an axis perpendicular to forward motion. One advantage of a variable threshold of this type is the ability to effectively filter the accelerometer data to remove road noise and other artifacts that can lead to signal that falsely indicate deceleration events.

A first threshold may be used to trigger a deceleration warning and a second threshold may be used to trigger a crash or severe event warning in which illumination continues without further input from the operator. A signal in response to reaching and/or exceeding such a second threshold must be delivered quickly so that, in the event that the operator is thrown from the vehicle, the illumination unit(s) are activated before the vehicle and the operator are separated by a distance that prevents successful signal transmission. The illumination unit may be programmed, for example, to flash repeatedly until turned off by the operator or until power is exhausted. This feature provides the advantage of helping locate the operator after an accident even when the operator is thrown far from the vehicle. Some embodiments of the invention may comprise, in addition to a primary light emitter, auxiliary illuminated fabric patches located onto the operator's apparel and/or helmet and positioned on the front, sides, and rear of the operator so that the auxiliary illuminated fabric patches illuminate only in response to said second signal.

A transmitter 14a functionally coupled to the processor 17 transmits a signal when a threshold value for the acceleration vector at a time t is reached or exceeded. The embodiment shown in FIG. 6 also comprises a functional indicator 18a and a feedback indicator 18b. Functional indicator 18a is powered by power source 15 and controlled by microprocessor 17 and is preferably a light that illuminates constantly or intermittently when the sensor unit is transmitting that signal to illuminate all receiver units. Functional indicator 18a may additionally or alternatively produce an audible sound to indicate that the sensor unit is functioning.

The sensor unit 10 may include a feedback receiver 14b that receives a signal from a feedback transmitter on illumination unit 30,40 when a light emitter on the illumination unit is activated. Receipt of such a signal by feedback receiver 14b causes the processor 17 to activate feedback indicator 18b to indicate to the operator that the illumination unit is functioning and illuminating. Functional indicator 18a and feedback indicator 18b may be combined into a single unit embodied, for example, as a single indicator with two LEDs, one for each indicator.

Transmitter 14a and receiver 14b preferably communicate via radio waves and may employ any standard wireless communication protocol such as addressed Bluetooth®, open Bluetooth®, Vehicle-to-Vehicle internet-based communication, or the like. One of skill in the art will appreciate that other forms of wireless communication such a infrared (IR) or microwave communication may also be used.

Figure 7:
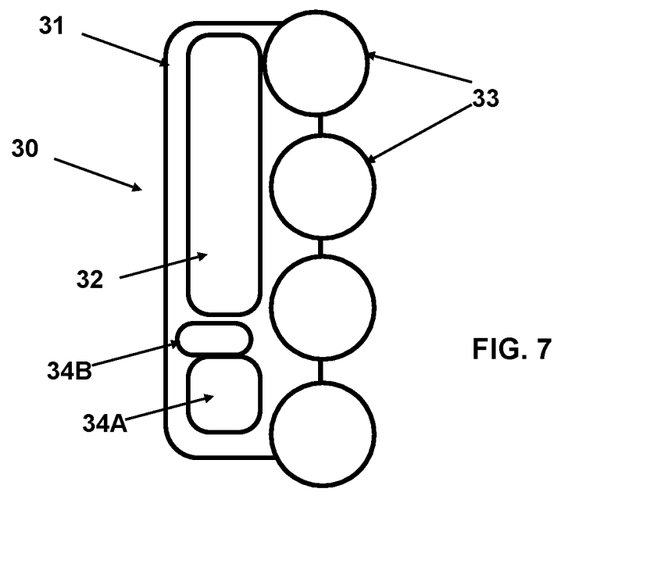
FIG. 7 is a side view of an embodiment of an illumination unit comprising multiple light emitters.

FIG. 7 shows a side view of a first embodiment of an illumination unit 30 configured to be worn by a vehicle operator or a passenger. The illumination unit 30 comprises a support frame or housing 31, a power supply 32, one or more light emitters 33, and a receiver 34. The embodiment in FIG. 7 shows four light emitters 33. Alternative embodiments may have one, two, three, five, or more light emitters. Light emitter 33 is preferably a LED and may be any light emitter capable of producing light with an intensity to be seen by the operator of a following vehicle. In a most preferred embodiment, the light emitter is a single high intensity LED with a horizontal angle of illumination of about 90 degrees or more when worn by an operator or passenger of the vehicle or when reversibly mounted to the vehicle. It is preferable that the light emitter(s) produce a horizontal angle of illumination of at least 90 degrees per automotive lighting research and established automotive lighting standards.

In FIG. 7, the portable illumination unit 30 is shown as being located on a helmet on the head of the vehicle operator. The helmet may be worn by a passenger sitting behind the operator if the vehicle. The illumination unit 30 may be built into the helmet, in which case the helmet is a means for reversibly attaching the illumination unit 30 to the head of the vehicle operator or head of a passenger. In another embodiment the illumination module may be reversibly mounted to the helmet so that the helmet, together with the reversible mounting means, serve as a means for reversible attaching the illumination init 30 to the vehicle operator or passenger. It is possible for an operator and/or a passenger to wear one or more illumination units 30,40. An illumination unit 30 comprising a helmet is preferably constructed such that the support frame or housing 31 is attached to the helmet so that the housing 31 is sheared from the helmet when subjected to a force equal to or greater than a predetermined force. This feature prevents an impact on the the frame or housing 31 from driving any portion of the frame or housing into the helmet in the event of a crash. Therefore the structural integrity of the helmet is preserved to offer the rider maximum protection.

Figure 8:
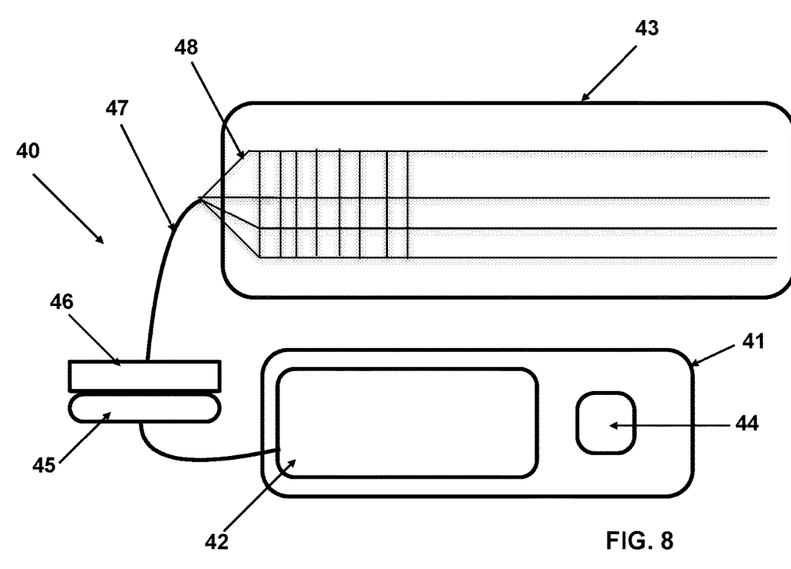
FIG. 8 is an illustration of an illumination unit comprising fiberoptic strands.

A second embodiment 40 of an illumination unit is shown in FIG. 8 comprising a housing or support frame 41 holding a power supply 42 and a receiver 44 as with the first embodiment shown in FIG. 7. As with the receiver 34a in FIG. 7, receiver 44 comprises a processor with control logic that instructs the power supply to activate one or more light emitters, in this case an array of LEDs 45, when a signal is received from the transmitter 14a of the sensor unit 10. The LED array 45 is shown as being outside the housing 41 and connected to the power supply 42. In alternative embodiments, the LED array 45 may be positioned on or inside the housing or support frame 41. In an alternative embodiment, the light source 45 may be a single LED. In another alternative embodiment, the light source 45 may be an incandescent, fluorescent, halogen, or other type of light bulb. An illuminating fabric 43 comprises a network of optical fibers 48 that may be woven, braided, or otherwise incorporated into or onto the illuminating fabric 43. In one embodiment, the illuminating fabric further comprises highly reflective material behind the optical fibers 48 to increase the luminosity of the fabric 43. Ends of the optical fibers 48 are held opposite LEDs of the LED array 45 such that ends of the fiberoptic strands are illuminated by the LEDs and light is conducted though the optical fibers and into the fabric. The size and shape of the illuminating fabric 43 may be variable but must be visible to operators of following vehicles when illuminated. This illuminated fabric may also be used, for example, in locations including the rear of the helmet and the back of the arms of jackets. An advantage of this technical feature is that it provides uniform illumination and increases the effective area of the indicator light. Another advantage is that the illuminating fabric is flexible and can move with the wearer.

Figure 9:
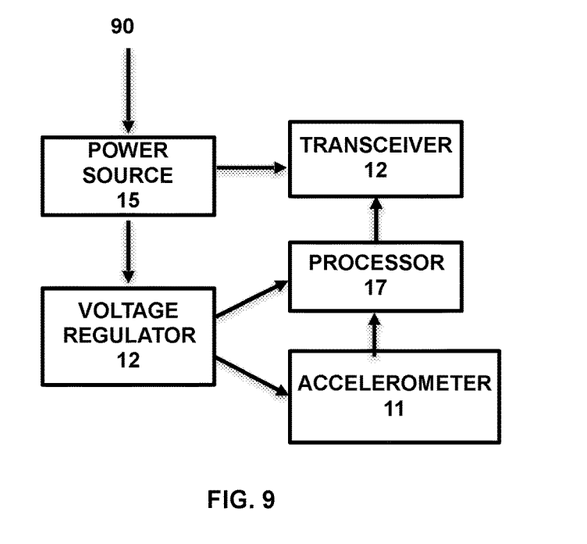
FIG. 9 presents a functional diagram of an exemplary sensor unit.

FIG. 9 presents a functional diagram of an exemplary sensor unit. Power source 15 provides power to accelerometer 11 and processor 17 via a voltage regulator 12 and also provides power to a transceiver 14 or, in a different embodiment, to a transmitter 14a. Accelerometer 11 provides acceleration data for each time t to processor 17, which combines accelerometer data for each of three different axes and determines whether or not the combined acceleration values meet or exceed a threshold value. The threshold value may be variable according to a predetermined, or preprogrammed, algorithm. The power source 15 may optionally be rechargeable and be recharged by an external power source 90 and/or harvesting kinematic energy that is transformed to electrical energy to recharge the power source. Such an energy harvesting device may use the movement of a magnet in an electromagnetic generator to generate power for recharging or a piezoelectric device stimulated to vibrate by road and/or engine vibrations. Additionally or alternatively, a thermoelectric generator comprising a junction of two dissimilar materials in the presence of a thermal gradient may be used to provide power for regeneration.

Certain embodiments have been described in the non-limiting context of a generic vehicle and a generic brake lamp. The generic vehicle may be any motorized vehicle such as an automobile, a truck, a tractor, a motorcycle, a snowmobile, or a watercraft. In other embodiments the vehicle may be a non-motorized vehicle such as a trailer designed to be pulled by, and electrically connected to, a motorized vehicle.

The invention claimed is:

1. A sensor and control apparatus for modifying a vehicle lighting system comprising:
 a support frame supporting a deceleration sensor unit comprising an accelerometer, a power storage unit, and a microprocessor controller;
 means for attaching the support frame to a fixed element of the vehicle;
 a first electrical connector configured for connection to the vehicle's electrical system through an existing electrical connector configured for connection to a brake lamp;
 a second electrical connector configured for connection to a brake light of the vehicle;
 a charging circuit coupled to said first electrical connector and to an energy storage component and configured for conveying power diverted from the vehicle's electrical system to said energy storage component; and
 a bypass circuit coupled to said first and second electrical connectors and configured to deliver power directly to said brake lamp when braking is indicated by the vehicle electrical system;
 an illumination circuit coupled to the power storage unit and configured to provide electrical power through the second electrical connector to illuminate the brake lamp;
 wherein:
 the accelerometer measures acceleration in three orthogonal axes for each time t and provides an output signal for each time t representing measured acceleration values at time t for each of said three axes to the microprocessor;
 said microprocessor controller comprises control logic configured to:
 compare a combination of said three measured acceleration values at time t to a first threshold value and
 issue a first signal to activate the illumination circuit in the event said combination of three measured acceleration values at time t is greater than or equal to said combination of first threshold values.

2. The apparatus of claim 1, wherein:
 the accelerometer measures acceleration in three orthogonal axes for each time t and provides acceleration values for each of said three axes in the form of a combined acceleration vector for time t to the microprocessor and
 the microprocessor is configured to determine whether or not the combined acceleration vector for time t exceeds a first threshold for a combined vector value for time t and, if the first threshold value is exceeded, to energize the by-pass circuit with energy from the power source.

3. The apparatus of claim 2, wherein the microprocessor is further configured to determine whether or not the combined acceleration vector for time t exceeds a second threshold for a combined vector value for time t and, if the second threshold value is exceeded, to repeatedly energize the illumination circuit with energy from the power source.

4. The apparatus of claim 2, wherein said second threshold value is variable depending on a measured vertical acceleration or a measured lateral acceleration relative to a direction of motion of the vehicle.

5. The apparatus of claim 1, wherein said microprocessor controller comprises software configured to detect the orientation of the gravity force vector with respect to the 3-axes of the accelerometer independent of the orientation of the accelerometer.

6. The apparatus of claim 5, wherein the microprocessor comprises software that selects a first threshold value for brake light activation depending on incline or decline of a road surface and depending on a acceleration force in the plane of, and perpendicular to, the direction of motion.

7. The apparatus of claim 1, wherein said microprocessor controller further comprises control logic configured to:
 compare a combination of said three measured acceleration values at time t to a second threshold value and issue a second signal to activate the illumination circuit in the event said combination of three measured acceleration values at time t is greater than or equal to said second threshold value.

8. The sensor and control apparatus of claim 1, further comprising a transmitter configured to transmit a signal when the illumination circuit is activated.

9. A sensor and control system comprising the sensor and control apparatus of claim 8 and feedback display, wherein said feedback display comprises:
a support frame holding a receiver and a feedback indicator
wherein
said receiver of the feedback display is in communication with the transmitter and the feedback indicator is in communication with said receiver and configured to illuminate when said receiver receives said signal from the transmitter.

10. A method for installing an apparatus for modifying a vehicle lighting system, said apparatus comprising:
a support frame supporting a deceleration sensor unit comprising an accelerometer, an energy storage component, and a microprocessor controller;
a first electrical connector configured for connection to the vehicle's electrical system through an existing electrical connector configured for connection to a brake lamp;
a second electrical connector configured for connection to a brake light of the vehicle;
a charging circuit coupled to said first electrical connector and to said energy storage component and configured for conveying power diverted from the vehicle's electrical system to said energy storage component; and
a bypass circuit coupled to said first and second electrical connectors and configured to deliver power directly to said brake lamp when braking is indicated by the vehicle electrical system; and
an illumination circuit coupled to the power storage unit and configured to provide electrical power through the second electrical connector to illuminate the brake lamp;
said method comprising:
mounting the apparatus to the vehicle,
connecting said first electrical connector to an electrical connector configured for connection to a brake lamp, and
connecting said second electrical connector to a brake light of the vehicle.

11. A portable deceleration warning system comprising:
a portable sensor unit comprising an accelerometer, means for reversibly mounting the sensor unit to a vehicle, a transmitter, a power supply, and a microprocessor;
a first portable illumination unit comprising a light emitter, a receiver, a power supply, and at least one of: means for reversible attachment to the vehicle and means for reversible attachment to an operator or passenger of the vehicle
wherein:
the accelerometer measures acceleration of the vehicle in three orthogonal axes for each time t and provides acceleration values for each of said three axes to the microprocessor;
the microprocessor is configured to determine whether or not a combined acceleration value for said three axes at time t exceeds a first threshold for combined values for said three axes at time t and, if the first threshold value is exceeded, to cause the transmitter to send a first signal to the receiver to energize the light emitter;
the first threshold value for the combined acceleration values is variable in proportion to one or more of the acceleration values for said three axes; and
the portable sensor unit is configured for attachment to the vehicle.

12. The portable deceleration warning system of claim 11, wherein the microprocessor is configured to determine whether or not the combined acceleration values for said three axes exceeds a second threshold for combined values for said three axes and, if the second threshold value is exceeded, to cause the transmitter to send a second signal to the receiver to repeatedly energize the light emitter at intervals independent of a further signal from the transmitter.

13. The portable deceleration warning system of claim 12, and further comprising auxiliary illuminated fabric patches located on the front, sides, and rear of the operator and wherein the auxiliary illuminated fabric patches illuminate only in response to said second signal.

14. The portable deceleration warning system of claim 13, wherein the illumination unit further comprises a means for receiving input from a user and said receiver comprises control logic to de-energize the light emitter in response to an input from a user.

15. The portable deceleration warning system of claim 11, further comprising a second portable illumination unit comprising a light emitter, a receiver, a power supply, and at least one of: means for reversible attachment to the vehicle and means for reversible attachment to an operator or passenger of the vehicle
wherein:
the accelerometer measures acceleration in three orthogonal axes for each time t and provides acceleration values for each of said three axes to the microprocessor;
the microprocessor is configured to determine whether or not the combined acceleration values for said three axes exceeds a first threshold for combined values for said three axes at time t and, if the first threshold value is exceeded, to cause the transmitter to send a first signal to the receiver of the second portable illumination unit and to energize the light emitter of the second portable illumination unit.

16. The portable deceleration warning system of claim 15, wherein said transmitter communicates with said receiver of said first and second portable illumination units via an open, non-addressed wireless communication protocol.

17. The portable deceleration warning system of claim 11, wherein said light emitter comprises an array of light emitting diodes (LEDs) and an array of optical fibers and ends of said array of optical fibers are aligned with LEDs of said array of LEDs.

18. The portable deceleration warning system of claim 17, wherein said light emitter comprises a patch of illuminating fabric comprising a weaving or braiding of said optical fibers.

19. The portable deceleration warning system of claim 11, wherein:
said first portable illumination unit comprises an article configured to be worn by the operator or passenger, said article comprising at least two light emitters separated by a distance of at least 10 cm when the article is worn by the operator or passenger.

* * * * *